United States Patent

[11] 3,589,361

| [72] | Inventors | Douglas A. Loper<br>Los Angeles, Calif.;<br>Dean R. Katerndahl, Wheaton, La. |
|---|---|---|
| [21] | Appl. No. | 735,923 |
| [22] | Filed | June 10, 1968 |
| [45] | Patented | June 29, 1971 |
| [73] | Assignee | Abbott Laboratories<br>North Chicago, Ill. |

[54] INTRAVENOUS CATHETER UNIT WITH FLEXIBLE WING SUPPORT AND INSERTER MEANS
7 Claims, 11 Drawing Figs.

[52] U.S. Cl. .................................................. 128/214.4,
128/348
[51] Int. Cl. .................................................. A61m 5/00
[50] Field of Search .................................. 128/214.4,
221, 348

[56] References Cited
UNITED STATES PATENTS

| 2,009,825 | 7/1935 | Wappler ...................... | 128/349 |
| 3,225,762 | 12/1965 | Guttman ...................... | 128/214.4 |
| 3,323,523 | 6/1967 | Scislowicz et al. ............. | 128/214.4 |
| 3,352,306 | 11/1967 | Hirsch ........................... | 128/214.4 |
| 3,459,184 | 8/1969 | Ring .............................. | 128/214.4 |
| 3,463,152 | 8/1969 | Sorensen ...................... | 128/214.4 |

FOREIGN PATENTS

| 1,024,410 | 3/1966 | Great Britain ............... | 128/214.4 |

*Primary Examiner*—Dalton L. Truluck
*Attorney*—Sherman and Shalloway

ABSTRACT: This invention provides an intravenous catheter, of the needle-inside type, having a wing assembly serving to guide the catheter and needle during venipuncture and adapted to hold the catheter firmly in place after venipuncture.

INVENTORS:
DOUGLAS A. LOPER
DEAN R. KATERNDAHL

BY *Sherman & Shalloway*
ATTORNEY

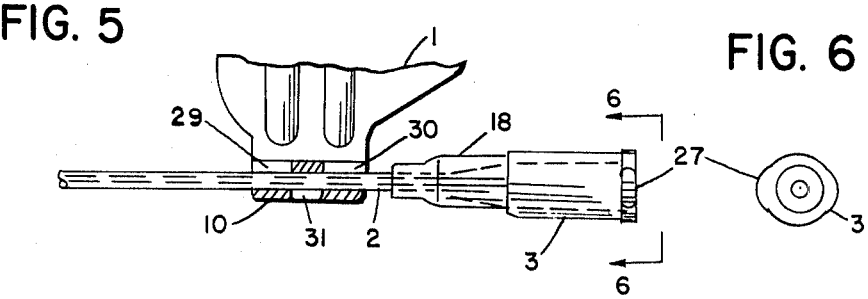
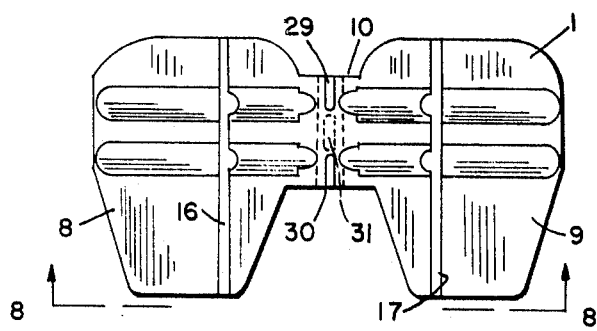
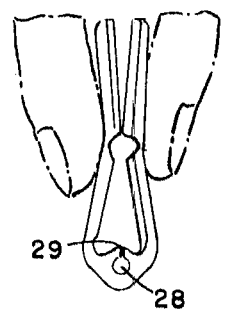
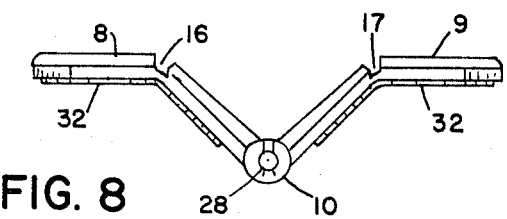
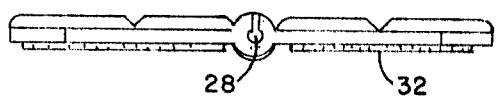
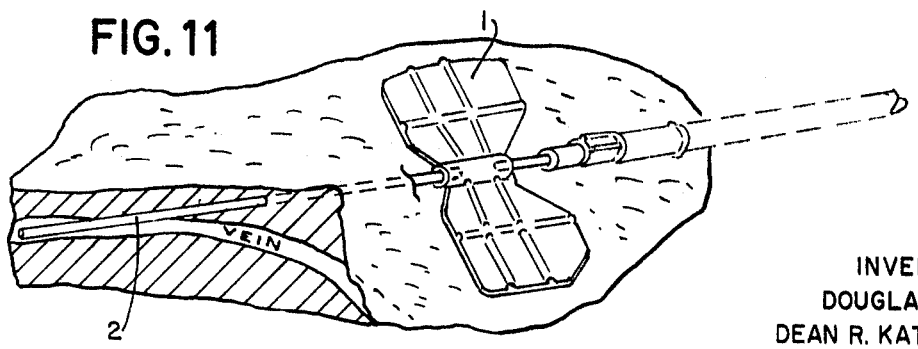

3,589,361

INTRAVENOUS CATHETER UNIT WITH FLEXIBLE WING SUPPORT AND INSERTER MEANS

BACKGROUND OF THE INVENTION

This invention broadly relates to surgical aids. More specifically, the instant invention relates to intravenous devices such as catheters. Catheters are broadly considered as any slender tube of metal, rubber, or plastic which is inserted into a body cavity including blood vessels, for distending the passage, for drawing off body fluids, or for injecting fluids into the body.

In the past, catheters were mainly used for drawing fluids from a natural body cavity, for example, drawing urine from the bladder when the normal body organs failed to function. More recently, catheters have been used for introducing fluids into the body for example in intravenous therapy and in transferring medicinal fluids. Furthermore, the use of catheters now extends not only to insertion into natural body cavities and passages but also to artificial cavities which have been produced by trauma or surgical procedure. The present invention is directed to catheters which are preferably utilized for intravenous therapy.

Catheters adapted to puncture the body to provide access to the body cavity may be classified as those which utilize the puncturing element as the fluid passage element and those which employ separate elements for puncture and for fluid passage.

In those devices which utilize a single puncturing and fluid passage element, the results are not always completely satisfactory due to the tendency of a puncturing element, such as a needle, to move within the body cavity or blood vessel and dislocate itself due to its inherent sharp point and the rigidity of the needle shaft.

In using this first class of catheters, a needle is inserted through the skin and the wall of the cavity to be treated, for example, a vein, artery, bladder, and thereafter the needle is connected by its exposed end to suitable equipment for drawing off or administering a fluid. For the above noted reasons, viz, mobility of needle, and rigidity of needle shaft when in place, these devices are generally considered not completely satisfactory from a clinical point of view.

The second type of catheter involves the insertion of a puncturing element and the insertion of a fluid passage element. The fluid passage element is normally a flexible tubing which is left in the cavity for fluid passage. The use of such a tubing allows movement within the cavity without the danger of puncturing the cavity wall.

This basic concept thus minimized the primary disadvantage of the first class of catheters viz, the tendency of needles to dislocate. Improvements on this basic concept such as the "needle-inside" catheters allowed simultaneous insertion of the two elements in the concentric arrangement to thereby facilitate venipuncture. With previous devices, for reasons of sterility, a technician making a venipuncture could only grasp the assembly at the hub area since this is the only area intended to remain outside the body. When this was done it was found that the flexibility of the assembly led to a lack of control over the puncturing needle tip because of the length, etc. The result was difficulty of proper insertion. Furthermore, once inserted it was still difficult to maintain the catheter in place because of no satisfactory means of fixation of the catheter to the body. Since the patient could not move, his discomfort was accordingly increased. In view of these disadvantages of previously used catheters, particularly those of the needle-inside puncturing type the medical and surgical art has felt a need for a satisfactory catheter which is easy to use, diminishes danger of contamination, and can be firmly held in place once inserted.

Heretofore, devices such as wing structures and tapes have been employed to aid in catheter placement and to secure the catheter to the skin after venipuncture. However, no suitable device has been developed. Exemplary of the prior art are U.S. Pat. Nos. 2,725,058 and 3,064,648 which provide wing assemblies on intravenous needles.

The wing assembly of this invention is distinguished from these devices since it is movable and is adapted to be either mobile or immobile depending on the use being made of the catheter and needle. On the other hand, the fixed wing assemblies of the prior art were not satisfactory since they limited the functional capabilities of the catheter. That is, the devices employed heretofore included wings which were fixed at a single position and were thus not adapted to eliminate the problem of flexibility, and adherence near the venipuncture site.

SUMMARY OF THE INVENTION

Accordingly, the present invention provides an improved wing assembly for catheters which eliminates the problems of the prior art by using an adjustable assembly which can be temporarily fixed to allow venipuncture and again temporarily fixed after adjustment to allow fluid administration.

Briefly, the present invention avoids the above-noted disadvantages of previously used needle-inside catheters by providing a unit on the catheter-needle assembly, intermediate the ends, which allows the catheter to be gripped close to the pointed end (tip) during venipuncture and which facilitates immobilizing attachment of the catheter to the patient during fluid transfer.

The invention comprises a wing assembly having a first wing and a second wing connected by an intermediate housing adapted to receive the catheter-needle assembly. The wings may be gripped during venipuncture and thereafter adhesively attached to the patient's body in order to hold the catheter in place.

Accordingly, the present invention has for its primary purpose the provision of a wing assembly for reducing the difficulty of using needle-inside type catheters and facilitating use of a catheter in a safe, sterile, and comfortable manner.

Still another object is to reduce the possibility of the catheter to become "lost" after venipuncture.

A further object is to provide a novel catheter having the above characteristics which comprises a novel wing assembly adapted to be gripped during venipuncture to reduce erroneous placement of the catheter.

Another object is to provide a novel needle-inside catheter having a wing assembly which is adapted to firmly hold the catheter in place after venipuncture.

Still another object is to provide a wing assembly in a catheter which is movable axially along the catheter from a puncturing position to an administering position.

A further object is to provide a catheter which may be used during venipuncture without flexing.

Still another object of the invention is to provide a wing assembly which can be rendered movable or stationary while attached to a catheter.

BRIEF DESCRIPTION OF THE DRAWINGS

Referring now to the drawings for a more detailed description of this invention and wherein like numerals represent like components;

FIG. 5 is a partial side view illustrating the catheter and wing assembly wherein the housing of the wing assembly is shown;

FIG. 6 is an end view along lines 6-6 of FIG. 5.

FIG. 7 is a top view of the wing assembly of this invention;

FIG. 8 is an end view of the wing assembly of FIG. 7 taken along lines 8-8 of FIG. 7 showing the normal position of the wing assembly;

FIG. 9 is an end view of the wing assembly of FIG. 7 with the wings being flexed into a venipuncture position;

FIG. 10 is an end view of the wing assembly of FIG. 7 with the wings being flexed into an administering position; and FIG. 11 is a perspective view, partly in section, showing the novel catheter assembly in use on a patient.

Figure 1:
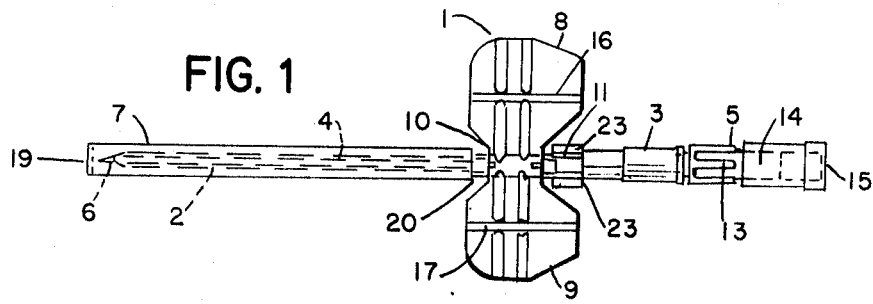
FIG. 1 is a top view illustrating the novel catheter and wing assembly of this invention.

In the Figures, numeral 1 designates the wing gripping assembly of this invention. A catheter is designated 2 having a catheter hub 3 and a needle is designated 4 having a needle hub 5.

PREFERRED EMBODIMENT

Figure 3:
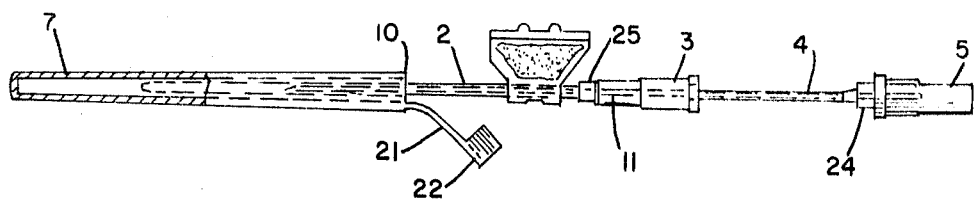
FIG. 3 is a partially exploded side view in partial section illustrating the components of the novel catheter and wing assembly of this invention.

Referring more specifically to the figures and especially to FIG. 1, the catheter 2 normally encloses the major length of needle 4. As seen in FIG. 1 the needle tip 6 extends from the catheter to facilitate venipuncture. As seen in FIG. 3 the catheter end is tapered to engage needle tip 6 thereby providing tight contact for easier insertion. Again, in FIG. 1, the bodies of catheter 2 and needle 4 are enclosed within a guard 7. As clearly shown in FIG. 1, the wing assembly 1 has a first wing 8 and a second wing 9 and an intermediate housing 10. Continuing from left to right in FIG. 1, after guard 7 and wing assembly 1, the catheter terminates in catheter hub 3 followed by the needle hub 5 which is partially enclosed in the normal position by catheter hub 3. The catheter hub 3 is provided with ribs 11 on its forward portion 12 which serve a purpose set out herein below. Needle hub 5 is also provided with ribs 13 on its forward portion. Rear portion 14 of the needle hub is of reduced diameter and is adapted to receive an air vent 15. The air vent is a hollow tubular element having one end closed by a glass fiber filter which allows air to be expelled from the needle but prevents blood from escaping. Thus, in venipuncture flashbacks of blood will be stopped by vent 15. As shown in FIG. 3, the needle 4 may be removed from the assembly by pulling on needle hub 5 to remove the needle 4 from engagement with the catheter 2 and catheter hub 3.

Figure 2:
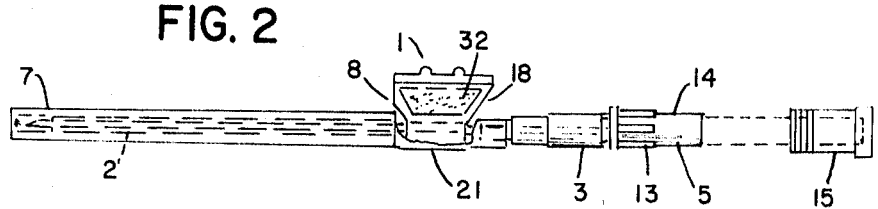
FIG. 2 is a side view of the assembly shown in FIG. 1.

Referring now to FIG. 8, the end view of wing assembly 1 shows that first wing 8 and second wing 9 are raised from the plane of the catheter and needle. In the embodiment shown, the wings are in their normal position in which first wing 8 and second wing 9 extend at 90° from each other as they emerge from intermediate housing 10. To facilitate packaging, the wings may, after their initial 90° extension, be formed with a reverse bend of about 45° along first line 16 and second line 17. This reverse bend is not essential to the invention but represents one shape which has been found to be practical and successful. If desired, the wings could extend at their 90° orientation without a bend or at any angle greater than or less than 90° which is found practical. FIG. 2 further shows that the underside of the wings, for example, underportion 18 of wing 8 is provided with a pressure sensitive adhesive tape 32 thereon. Before use, the adhesive is covered by a suitable release sheet such as a plastic tape or a suitably coated paper.

The adhesive used may be a synthetic adhesive which is pressure sensitive and which is permanently adhered to the wing structure. This adhesive should be adapted to firmly adhere to the body of the patient but should not adhere to such an extent that undue discomfort results when the wing is removed from the body. Suitable adhesives include acrylate polymers and copolymers. Specifically, a suitable adhesive which is of a surgical quality and which is adapted to be coated on elements intended to adhere to a patient's skin is an acrylate-N-tert-butylacrylamide copolymer. The acrylate copolymers which have been found to adhere to skin are copolymers of alkyl acrylates having at least six carbon atoms in an alkyl group and N-tert-butylacrylamide. For example, alkyl acrylate monomers include 2-ethylhexyl acrylate, and the heptyl, octyl, nonyl, and decyl acrylates. The copolymers are prepared from about 70—75 parts by weight of the acrylate monomer and about 25—30 parts by weight of the N-tert-butylacrylamide, the specific reaction conditions are determinable by those skilled in the art.

The adhesive may be spread on the undersides of the wings with a knife coater to give 1 mil thickness of dry mass. The wing may be treated to improve the adhesion of the adhesive to the plastic wing for example if a polyethylene wing assembly is used, it can be chemically treated to provide an oxidized, polar surface. In applying the adhesive, a solvent solution may be used and the solvent evaporated to dry the adhesive. If desired the wing and adhesive may be perforated to minimize maceration. It is, of course, within the scope of this invention to use other adhesives and other methods of applying them.

Referring to FIG. 1, numeral 7 designates a guard which has a first end 19. A second end 20 has a guard flange 21 forming a partial extension of guard 7 as is best seen in FIG. 3. Attached to guard flange 21 is a U-shaped section 22 of enlarged width which has an inner diameter closely approximating the outer diameter of catheter hub 3. To enable the guard to be removably attached to the catheter having the wing assembly 1 thereon the U-shaped section 22 has inwardly projecting elements 23 which are adapted to engage portion 25 on catheter hub forward section 12. Thus a snapping action presses hub 3 into U-shaped section 22 and the elements 23 on section 22 engage portion 25 to firmly secure the guard on the catheter. In this position the needle 4 and catheter 2 are enclosed within guard 7. To remove the guard prior to venipuncture, a slight pulling action disengages elements 23 from portion 25. The entire guard 7 with flange 21 and U-shaped section 22 may be molded from a plastic such as polypropylene, polyethylene or other suitable material and the plastic is advantageously translucent so the enclosed needle and catheter are visible for inspection.

Figure 4:
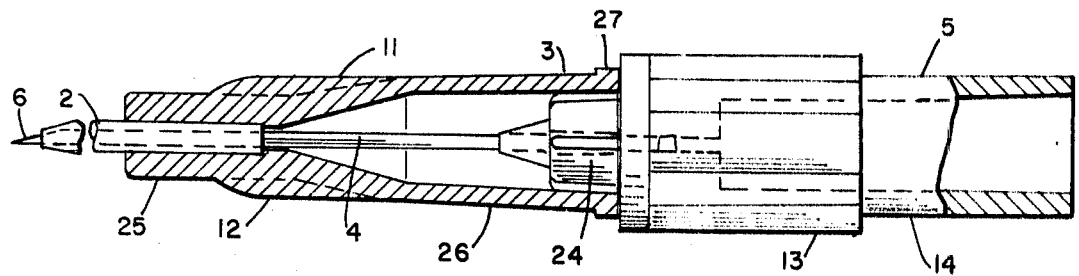
FIG. 4 is an enlarged view in partial section illustrating the hub assemblies of the catheter and needle of this invention.

FIG. 3 illustrates the relationship of the components in their assembled state. Initially in preparation for use the guard 7 is removed by disengaging U-shaped section 22 from catheter hub 3 and then sliding it off the catheter-needle assembly. This leaves needle 4 and a forward portion of the needle hub 24 enclosed by the catheter and catheter hub respectively (FIG. 4). The needle may be removed by pulling in a direction opposite to the direction of removal of the guard 7.

FIG. 4 illustrates in enlarged section the engagement of the catheter hub and needle hub. Catheter hub 3 has a forward portion 12 which is of reduced diameter and which carries ribs 11. The catheter 2 is rigidly secured in the small forward portion 25 of the catheter hub in the relationship shown. The manner of attachment will be apparent to those skilled in the art; for example, a preformed catheter may be solvent or epoxy sealed to a rigid hub thereby resulting in an effective weld at the junction thereof while maintaining an adequate fluid passage area. The opposite end of the catheter hub is designated as portion 26 and is provided with a flange or Luer Lock 27 which is adapted to abut the forward area of the needle hub. Ribs 13 are provided on the needle hub 5 to facilitate grasping the needle hub when the needle is being removed from the catheter. Rear portion 14 of the needle hub is adapted to receive air vent 15 as shown in FIG. 1. The needle 4 is shown in the drawings as having a beveled puncturing needle tip 6. The needle 4 may be made of suitable material such as stainless steel. The needle is hollow and the needle tip 6 may have any suitable geometry such as the diamond-shaped point or the oval-shaped point which are commonly used in puncturing needles.

The novel wing assembly of this invention is specifically shown in FIGS. 5 and 7 through 11. The basic wing assembly 1 comprises a first wing 8 and a second wing 9 connected by an intermediate housing 10. The assembly is mounted on catheter 2 as seen in FIG. 5 by sliding the catheter through intermediate housing 10. The intermediate housing has an axial bore or aperture 28 (FIG. 8) to receive catheter 2. Basically, the intermediate housing 10 is formed of a cylindrical element having recesses or struck out areas designated as 29 and 30, on one side thereof and having an intermediate recess 31 in the walls of intermediate housing 10 on the side opposite recesses 29 and 30. The recesses are illustrated as being in communication with axial aperture 28; however, it is clear that they need only be disposed close to or contiguous with aperture 28 to permit deformation of the housing 10.

As was described hereinabove, the first wing 8 and the second wing 9 initially and normally extend from housing 10 at 90° relative to each other although this invention is not limited to such a specific angle. In the embodiment shown, the wings have lines of reduced thickness, i.e., first line 16 and second line 17 which act as hinges. At these lines the wings are given a reverse bend of about 45°, away from each other, into a plane parallel with the plane of the needle and catheter. Also the undersides of the wings are provided with adhesive which is initially covered by removable tapes 32.

FIG. 6 shows an end view of the catheter hub 3 showing hub flange 27, which is of enlarged diameter, adapted to receive the connecting means, not shown, of the equipment used to administer or withdraw fluid.

FIG. 9 shows a first hold position of the wings during venipuncture wherein the wings are moved in a first direction from the normal position to be pressed together. Due to the construction of the housing, particularly due to recesses 29 and 30, the operation of the novel assembly of this invention results in a closing of the normally open areas 29 and 30 in a pinching action as shown in FIG. 9. This reduces the cross section of axial aperture 28 to deform the intermediate housing 10 to grip the catheter thereby restraining relative axial movement of the assembly 1 and the catheter 2.

Furthermore, a second hold position shown in FIG. 10 also distorts axial aperture 28 and causes a gripping effect on catheter 2 in the opposite sense to that shown in FIG. 9. That is, instead of recesses 29 and 30 permitting deformation of the housing the bottom areas where intermediate recess 31 is provided (see FIGS. 5 and 7) are pinched and the catheter is compressed at this area to restrain axial movement when the wings are moved from the normal position to the second hold position in a second direction opposite to the first direction. This is beneficial because, after venipuncture, when the wing assembly is adhered to the patient's skin as seen in FIG. 11, the catheter is immobilized.

The materials used in constructing the catheter, the needle, and the wing assembly of the invention may vary with different desired uses. From the standpoint of durability and sterility the wing assembly is preferably a molded synthetic plastic material such as polyethylene, polypropylene, plasticized polyvinylchloride or other suitable plastics. The catheter hub may also be molded of the noted plastics with the added characteristic of translucency. The needle may be any steel needle having a hub and tip produced by procedures and of materials readily apparent to those skilled in the art. The catheter tip should be formed with a taper to facilitate entry through skin and vein.

The use of the novel assembly is considered apparent from the description above of the components and their respective functions. However, for clarity, the method of use will be described. Initially, the guard 7 is removed by pulling U-shaped section 22 from the catheter hub 3. The unit is now ready for conventional venipuncture. At this point vent 15 should be left in place to avoid the backflow of blood via needle 4 from the vein. By leaving the wings in their normal orientation, the wing assembly is moved forward without manually touching the exposed catheter to a distance of approximately one-half the length of the catheter. Next, the wings are pressed together between thumb and forefinger as shown in FIG. 9 and, as discussed above, this prohibits further axial movement of the wings. In this position, the novelty of this invention is apparent. The flexibility of the needle is eliminated since it is held at a point intermediate its length but the sterility of the catheter is maintained since it is not touched by the grasping of the needle. With the needle bevel up, the venipuncture is made. If it is unsuccessful, i.e., the vein is missed, the catheter and needle are completely withdrawn from the patient before reinserting the needle into the catheter and trying again. When venipuncture is successful, the wings are released and they return to their normal state wherein they are movable along the catheter. Now the catheter is advanced carefully into the vein or cavity while the needle is withdrawn completely by pulling on needle hub 5. Then the extrinsic equipment, not shown, is connected to the catheter hub 3. To secure the catheter in place the tapes 32 are removed from the underside of the wings and the adhesive wings are pressed against the skin. As noted above, this causes distortion of the intermediate housing 10, thus gripping the catheter and prohibiting relative movement therebetween. It is also desirable to place the wing assembly close to the venipuncture site to increase the stability of the unit, and this is possible with the novel wing assembly of this invention, since it is movable after venipuncture and before attachment to the patient.

The specific embodiment shown above and the language sued to describe the components and their functions are in no way intended to be limiting, but are merely used for illustrative purposes.

It is to be particularly pointed out that the angles of orientation of first wing 8 and second wing 9 are given merely by way of example and do not limit the inventive concept. So long as the wings may be flexed from a normal movable position to an operational position wherein the entire assembly is rendered immovable any suitable wing orientation can be used Having described this invention in full, clear and concise terms

We claim:

1. An intravenous catheter assembly comprising an elongated catheter;
   a hollow needle movably disposed in said catheter; and
   a flexible wing assembly including an intermediate housing having an axial bore therethrough, said housing having first recess means on one side thereof contiguous with said bore and second recess means on a second side thereof opposite said first side and contiguous with said bore, and first and second flexible wings extending radially from said housing, said first and second wings being disposed on opposite sides of said housing between said first and second recesses and being movable from a normal position to a hold position to deform said housing;
   said catheter being removably received in said axial bore of said housing such that said flexible wing assembly is movable along said catheter to a plurality of axially displaced positions when said first and second wings are in said normal position and said catheter being gripped by said housing at any of said axially displaced positions when said housing is deformed by said first and second wings being moved to said hold position.

2. The invention as recited in claim 1 wherein said housing has first and second ends, said first recess means includes a first recess centrally disposed between said first and second ends in communication with said axial bore and said second recess means includes second and third recesses disposed adjacent said first and second ends, respectively, in communication with said bore.

3. The invention as recited in claim 1 wherein said catheter carries a hub on one end thereof and a tubular guard surrounds said catheter and has a U-shaped section at one end thereof removably secured to said hub.

4. The invention as recited in claim 3 wherein a hub is provided for said needle, said needle including a removable air vent sealing said needle hub.

5. The invention as recited in claim 1 wherein said first and second wings have adhesive means secured to the undersides thereof whereby said first and second wings may be secured in said hold position.

6. An intravenous catheter assembly comprising an elongated catheter;
   a hollow needle movably disposed in said catheter;
   a gripping assembly including a housing having an axial bore therethrough and first and second wings extending from opposite sides of said housing, said catheter being removably received in said axial bore; and
   said housing having a plurality of recess means therein contiguous with said axial bore to permit deformation of said housing when said first and second wings are moved, said first and second wings having a normal position and being movable in a first direction from said normal position to a first hold position to deform said housing and grip said catheter and in a second direction from said normal position to a second hold position to deform said housing and grip said catheter, said second direction being opposite to said first direction.

7. The invention as recited in claim 6 wherein said first and second wings have adhesive means secured to the undersides thereof whereby said first and second wings may be secured in either of said first or second hold positions.